United States Patent [19]
Barone

[11] 3,916,232
[45] Oct. 28, 1975

[54] DYNAMOELECTRIC MACHINE

[75] Inventor: Michael R. Barone, Sycamore, Ill.

[73] Assignee: General Electric Company, Fort Wayne, Ind.

[22] Filed: Dec. 7, 1973

[21] Appl. No.: 422,674

Related U.S. Application Data

[63] Continuation of Ser. No. 246,455, April 21, 1972.

[52] U.S. Cl. .................................................. 310/63
[51] Int. Cl.² ............................................. H02K 9/06
[58] Field of Search .......... 310/52, 157, 63, 254, 64, 310/258, 62, 259, 60, 261, 42, 264, 265, 61, 269, 58, 88, 260, 85, 91; 29/596

[56] References Cited
UNITED STATES PATENTS

| | | | |
|---|---|---|---|
| 1,824,839 | 9/1931 | Ross | 310/63 |
| 2,167,487 | 7/1939 | Moss | 310/63 |
| 2,970,234 | 1/1961 | Erickson | 310/61 |
| 3,243,617 | 3/1966 | Cunningham | 310/63 |
| 3,441,762 | 4/1969 | Luenberger | 310/157 |
| 3,518,468 | 6/1970 | Wightman | 310/63 |
| 3,518,471 | 6/1970 | Wightman | 310/85 |
| 3,527,970 | 9/1970 | Wightman | 310/63 |
| 3,538,598 | 11/1970 | Wightman | 29/596 |
| 3,544,820 | 12/1970 | Wightman | 310/42 |
| 3,705,994 | 12/1972 | Berry | 310/91 |

FOREIGN PATENTS OR APPLICATIONS

1,366,563  6/1964  France .................. 310/62

*Primary Examiner*—R. Skudy
*Attorney, Agent, or Firm*—Joseph E. Papin

[57] ABSTRACT

A dynamoelectric machine is provided with a stator having windings therein which collectively form an annular grouping of end turns, and a rotor is mounted for rotation in the stator. A plurality of vanes is disposed on the rotor adjacent the inner periphery of the annular grouping of end turns, and means is mounted on at least some of the vanes for blowing air over the annular grouping of end turns including a plurality of other vanes bent from the blowing means so as to extend over the outer periphery of the annular grouping of end turns adjacent thereto.

There is also disclosed a means integrally formed with at least some of the vanes of a rotor for receiving a means for blowing air over the end turns of windings disposed in a stator in which the rotor is rotatably mounted, and means on the blowing means are secured in mounting engagement to the receiving means.

30 Claims, 9 Drawing Figures

DYNAMOELECTRIC MACHINE

CROSS-REFERENCE TO RELATED APPLICATIONS

This is a continuation of copending application Ser. No. 246,455 filed Apr. 21, 1972, which is specifically incorporated by reference herein.

BACKGROUND OF THE INVENTION

This invention relates generally to dynamoelectric machines and in particular to those having means secured to a rotatable assembly of the dynamoelectric machine for blowing air over the windings thereof.

As is well-known in the art, most dynamoelectric machines, such as electric motors and generators, comprise a stationary assembly, generally referred to as a stator, in which a rotatable assembly, generally referred to as a rotor, is rotatably mounted. Typically, the stator is constituted by a magnetic core having a cylindrical bore in which the rotatable assembly is disposed, and a plurality of winding receiving slots extend generally longitudinally through the core between a pair of opposite end faces thereof. Electrically energizable windings are disposed in the slots, and the windings include a plurality of end turns extending between slots adjacent each of the opposite core faces thereby to collectively form a pair of opposite annular groupings of winding end turns. A pair of opposite end shields may be secured by suitable means well known in the art to the dynamoelectric machine in spaced relation with the stator and with the annular grouping of winding end turns, and a bearing or the like is typically carried by each end shield with the rotatable assembly suitably journalled in the bearings.

During operation of various dynamoelectric machines, the temperature of the stator windings becomes sufficiently elevated to render the inclusion of air cooling or blowing means, such as fans or blowers or the like, desirable for efficient machine operation and longevity. Heretofore, as exemplified by U.S. Pat. No. 3,243,617 which issued to Eldon R. Cunningham on Mar. 29, 1966, this has been accomplished by provision of circularly disposed, integral fan blades or vanes projecting from one end of the rotor assembly concentrically within the annular groupings of winding end turns. Sets of arcuate vanes are riveted or staked to the other end of the rotor assembly which vanes project out from within an annular grouping of end turns closely adjacent the end of the grouping which end extends generally radially of the rotor shaft.

More recently a group of patents have issued, singularly and jointly, to Lawrance W. Wightman, namely U.S. Pat. Nos. 3,518,468, 3,518,471, 3,527,970, 3,538,598, 3,544,820 and 3,610,976. In these patents, dynamoelectric machines are also shown having the aforementioned circularly disposed integral fan vanes projecting from a pair of opposite short circuiting end rings on a rotor and generally coaxially of the rotor shaft. In some of these patents, a blower for blowing air over a plurality of end turns of the dynamoelectric machine is secured by a plurality of screws directly to the fan vanes. In others of these patents, a ring member is secured to the short circuiting end ring of the rotor by a plurality of screws and extends into abutment with the fan vanes, and a blower, generally of the type mentioned above, is secured to the ring member by a plurality of screws. In general, the Wightman blower is an annulus presenting a concave surface facing the end and the arcuate outer periphery of the annular grouping of end turns, and sets of blower blades are secured to the annulus for rotation over the end and outer peripheral surface of the winding end turn.

Dynamoelectric machines employing the just described blowers or fans for cooling stator windings have not been without certain disadvantageous or undesirable features. For example, formation of the Wightman type blowers in which a set of blades extend from a concave annulus surface requires either the use of a mold in forming the blower or individual mounting of the blades to and annulus. Furthermore, in securing the formed blowers to the rotatable assembly, numerous screws have had to be individually threaded through the blower annulus and into the rotatable assembly. In addition, a very significant drawback arises from the presence of rotating blades disposed over the radial end surface of the winding end turns, namely that the presence of such structure results in axial elongation of the dynamoelectric machine as a whole.

In both the Cunningham and Wightman patents, the dynamoelectric machines disclosed include a cylindrical shell shrouding the rotatable assembly and stator windings. Though apertured, this shell effects another disadvantageous feature in that it inhibits the free flow of air radially away from the winding end turns. The concave annulus of Wightman provides yet another disadvantageous feature by forming a restriction to air flow or barrier about the outer periphery of the end turns. Although elimination of these air flow restrictions is desirable such, per se, is not without attendant problems. In some applications, such as in driving clothes dryers, lint and other particles are usually present in the ambient air.

For instance, air-borne lint may be drawn in through the shell and end shield apertures during energization of the dynamoelectric machine thereby to collect along the periphery of these apertures, and a "snowballing" action of the collected lint will, in time, close these apertures thereby restricting the proper flow of cooling air over the winding end turns disposed within the shell and end shield. In addition, upon de-energization of the dynamoelectric machine, these particles tend to settle out, as for example, upon a protective shroud about the winding end turns and form a particulated blanket. If such a blanket were permitted to form with the machine shaft disposed horizontally and without a protective shroud, the blanket would cover portions of the winding end turns themselves acting as a disadvantageous heat transfer barrier. This disadvantageous feature also has inhibited removal of dynamoelectric machine components.

SUMMARY OF THE INVENTION

Amont the several objects of the present invention may be noted the provision of a dynamoelectric machine which overcomes the disadvantages features discussed hereinbefore, as well as others, of the prior art dynamoelectric machines; the provision of a dynamoelectric machine generally devoid of air flow restrictions about the outer periphery of the winding end turns thereof and which dynamoelectric machine may nevertheless be employed in air-borne lint or other particulate environment; the provision of means integrally formed on at least some of a plurality of fans vanes on a rotatable assembly of the dynamoelectric machine to which a means for blowing air over the winding end turns is mounted; the provision of means mounted on the fan vanes of the rotatable assembly for blowing air over the winding end turns of the dynamoelectric machine including means bent from the blowing means so as to extend over the outer periphery of the winding end turns. Other objects and advantageous features of the present invention will be in part apparent and in part pointed out hereinafter.

In general, a dynamoelectric machine in one form of the present invention has a stator with windings therein collectively forming a generally annular grouping of end turns, and a rotor is mounted for rotation in the stator and has a plurality of vanes disposed generally adjacent the inner periphery of the annular grouping of end turns.

Means for blowing air over the end turns extends generally adjacent the free end portion of the end turns, and stud means integral with at least some of the vanes is deformed into engagement with the blowing means for mounting it to the rotor. Means is provided on the blowing means for locating it on at least some of the stud means relative to the vanes wherein the stud means is deformed into the engagement with the blowing means generally about the locating means.

Also in general and in one form of the invention, a dynamoelectric machine has a stator with windings therein which collectively form a generally annular grouping of end turns, and a rotor is mounted for rotation in the stator and has a plurality of vanes disposed generally adjacent the inner periphery of the end turns. Means for blowing air over the end turns extends generally adjacent the free end portion of the end turns, and means is integrally formed on at least some of the vanes and adapted to be deformed into displacement preventing engagement with the blowing means for mounting it to the rotor. Means is provided on the blowing means for locating it on at least some of the mounting means relative to the vanes wherein the mounting means is deformed into the displacement preventing engagement with the blowing means generally about the locating means thereby to mount the blowing means to the rotor, and the blowing means includes a plurality of other vanes extending over at least a part of the outer periphery of the end turns.

Further in general, a dynamoelectric machine in one form of the invention has a magnetic core with a pair of opposite end faces. A bore is provided in the core, and a plurality of winding receiving slots are in the bore between the end faces. A plurality of windings are disposed in the slots and include end turns in a generally annular grouping thereof adjacent at least one of the end faces. A rotatable assembly includes a rotor mounted for rotation in the bore, an end ring on the rotor, and a first set of annularly disposed vanes extending from the end ring adjacent the inner periphery of the end turns. An annulus which is mounted to at least some of the vanes of the first vane set includes a plurality of vents in the annulus adjacent the end turns, and a second set of annularly disposed vanes on the annulus adjacent the outer periphery of the end turns whereby upon rotation of the second vane set air may be drawn through the vents into contact with the end turns and thence radially away therefrom. The outer periphery of the annulus is serrated to form a set of teeth from which the vanes of the second vane set respectively extend.

Still further in general, a dynamoelectric machine in one form of the invention has a magnetic core, and a rotor is rotatably disposed with the core. An end ring is secured to the rotor, and a first set of vanes projects from the end ring. A plurality of studs project from the ends of the first vane set, and a first set of studs included in the plurality of studs have stud neck portions and stud end portions spreading generally radially therefrom. An annulus extends generally radially from the stud neck portions of the first stud set in abutment with the ends of the first vane set and the stud end portions, and a second set of vanes extends from the annulus in spaced relation about the first vane set.

Also in general and in one form of the invention, a dynamoelectric machine has a magnetic core, and a bore and a plurality of winding receiving slots extend through the core between a pair of opposite end faces thereof. A plurality of windings pass through the slots and include end turns passing between at least some of the slots adjacent at least one of the end faces forming a generally annular grouping of end turns. An end shield is mounted in spaced relation with the magnetic core to define an air space generally between the end shield and the one end face of the magnetic core, and the air space communicates radially from the bore about the grouping of end turns to the exterior of the dynamoelectric machine. A rotatable assembly includes a rotor mounted for rotation within the bore, a plurality of vanes on the rotor and extending therefrom adjacent the inner periphery of the grouping of end turns, and a generally annular fan having radially inner and outer portions. The fan is mounted adjacent its radially inner portion to at least some of the vanes adjacent the free ends thereof, and a plurality of other vanes on the fan adjacent the radially outer portion thereof are disposed within the air space and extends about the outer periphery of the annular grouping of end turns in close spaced relation therewith. A plurality of vents are provided in the fan between said radially inner and outer portions thereof and are disposed generally adjacent the free end of the annular grouping of end turns. Upon rotation of the rotatable assembly, air may be drawn by the fan through the vents into contact with the annular grouping of end turns and then radially away therefrom so as to blow away any foreign particles which may have settled out from the environment in which the dynamoelectric machine may be operated into the air space and onto the annular grouping of end turns when the rotatable assembly is at rest.

BRIEF DESCRIPTION OF THE DRAWING

Corresponding reference characters indicate corresponding parts throughout the several views of the drawings.

The following examples illustrate the invention and are not to be construed as limiting in any manner.

DESCRIPTION OF THE PREFERRED EMBODIMENTS

Figure 1:
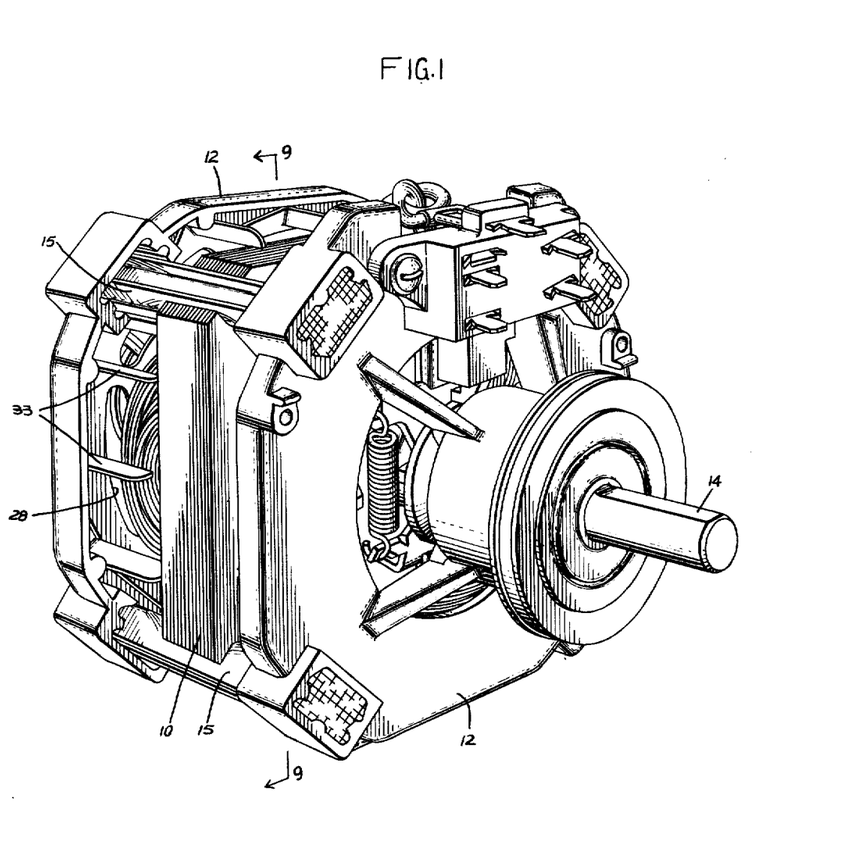
FIG. 1 is a perspective view of a dynamoelectric machine embodying principles of the present invention in one form.

Referring now in detail to the drawings, there is shown in FIG. 1 a dynamoelectric machine, such as an electric motor, having a stator or magnetic core 10 and two rotor bearing carrying end shields 12 and in which bearings (not shown) a rotor shaft 14 is journalled. Four beams 15 are rigidly mounted to core 10 and to end shields 12 thereby rigidly securing these components together. The joints or connections between end shields 12 and beams 15 may be formed by the use of molten metal, but other connecting means, which are well known in the art, are also contemplated.

Figure 2:
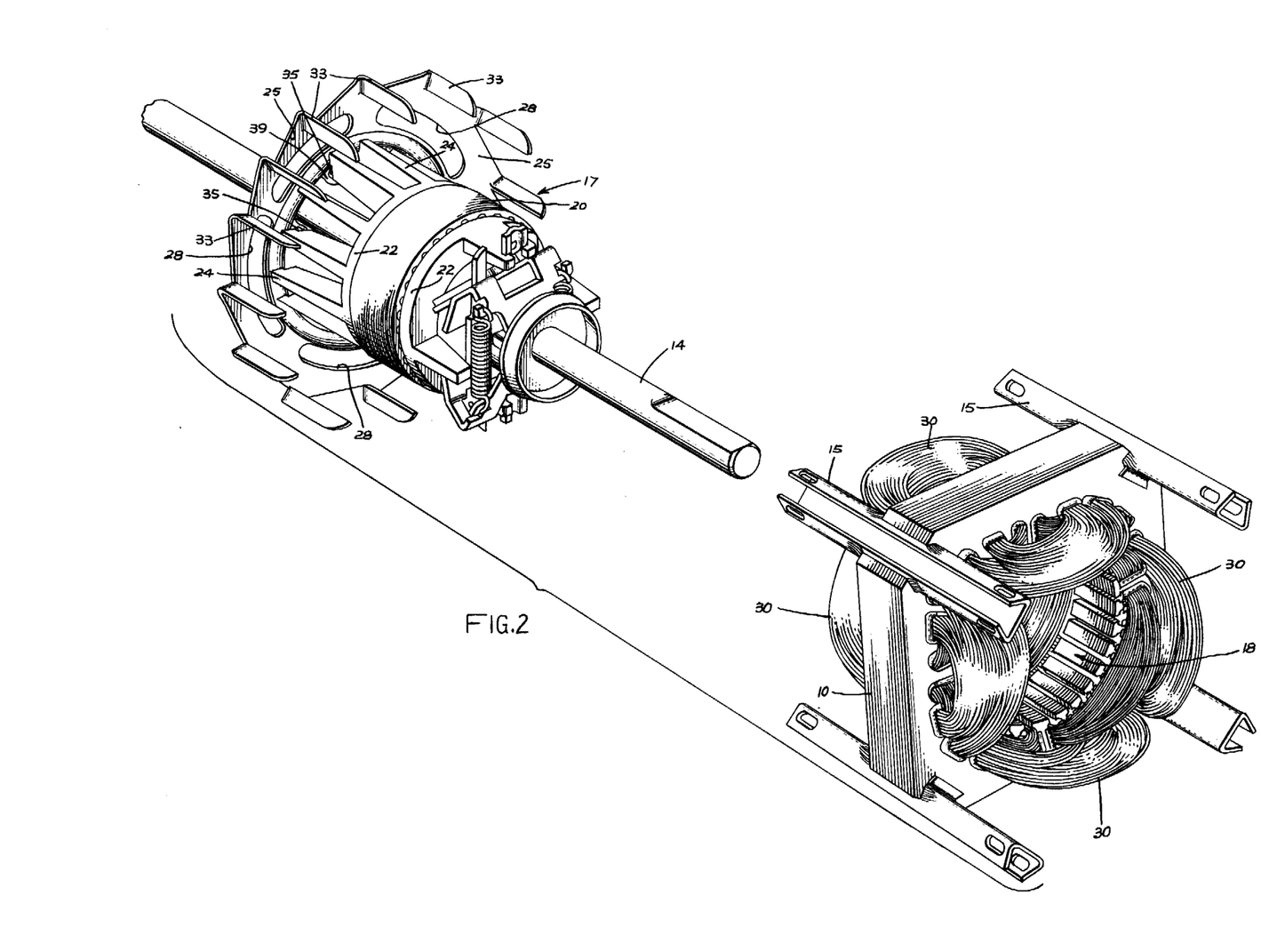
FIG. 2 is a perspective view of axially disassembled rotatable and stationary assemblies of the dynamoelectric machine of FIG. 1.

With reference next to FIG. 2, a rotatable assembly 17, shown axially removed from within a cylindrical bore 18 of magnetic core 10, is generally constituted by shaft 14 to which a rotor 20 is mounted for conjoint rotation within bore 18. A pair of opposite rotor end rings 22 are cast or otherwise secured to the ends of the rotor. A set or plurality of circularly disposed vanes 24, formed integrally with one of the end rings 22, extends from that end ring coaxially with shaft 14. An annulus or substantially annular member or annulus 25, which may be a zinc coated steel or other sheet metal if desired, is secured to the ends of at least some of the vanes, such as the alternate vanes, as hereinafter described in greater detail. Annulus 25 has generally arcuate apertures, openings or vents 28 through which air may be drawn in for cooling an annular composite grouping of winding end turns 30 upon operation of the motor. The location of the vents 28 also permits positioning shims (not shown) temporarily inserted into stator 10 between bore 18 and rotor 20 to be axially withdrawn therethrough during manufacture of the motor. From adjacent the outer periphery or radially outer edge of the annulus 25 project a set or a plurality of generally circularly disposed vanes 33 radially about vanes 24. Vanes 33 are radially spaced from vanes 24 a distance sufficient to position annular grouping of end turns 30 generally in rather close spaced relation therebetween.

Figures 3, 4, 5, 6:
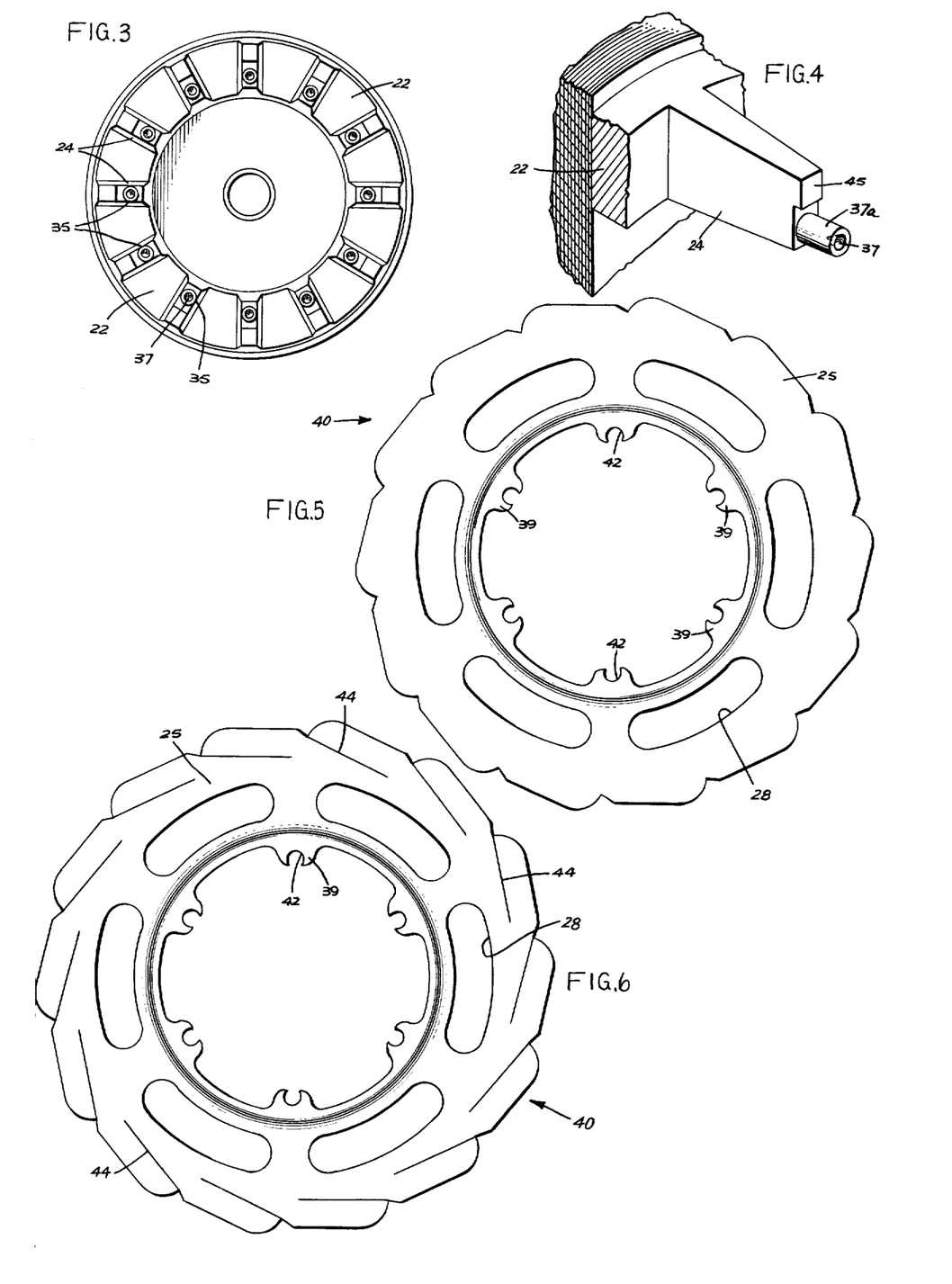
FIG. 3 is an end view of a rotor end ring of the rotatable assembly shown in FIG. 2.
FIG. 4 is an enlarged fragmentary view showing in perspective a vane of the end ring of FIG. 3.
FIG. 5 is a plan view of a fan of the dynamoelectric machine of FIG. 1 which fan is shown in an early stage of formation.
FIG. 6 is a plan view of the fan of FIG. 5 depicted in a later forming stage.
Figure 8:
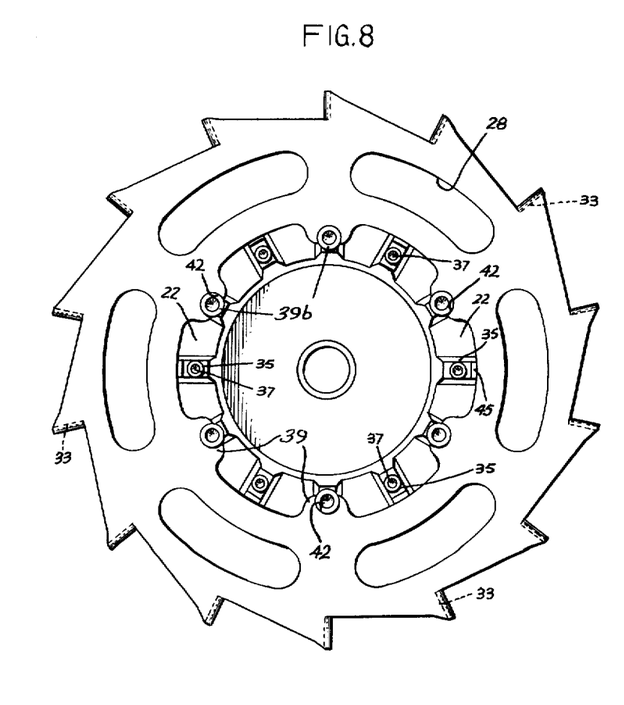
FIG. 8 is a plan view showing the fan of FIG. 7 secured to the rotor end ring of FIG. 3.

Turning now to FIGS. 3 and 4, vanes 24 are seen to taper slightly as they project from end ring 22. Integrally formed mounting means, such as a generally truncated conical stud 35, projects from the end or free end of each vane 24, each of which studs has a recession 37. The end ring 22, vanes 24 and studs 35 may be aluminum or an alloy thereof, if desired. This composition and configuration of the studs 35 renders them deformable in that an axial force applied thereto causes the studs to extrude generally radially and thereby form stud heads 37a, as shown in FIG. 8, of wider dimension than the residual neck portions 37b adjacent the vane ends. The function of the deformable studs 35 is subsequently explained.

Figure 7:
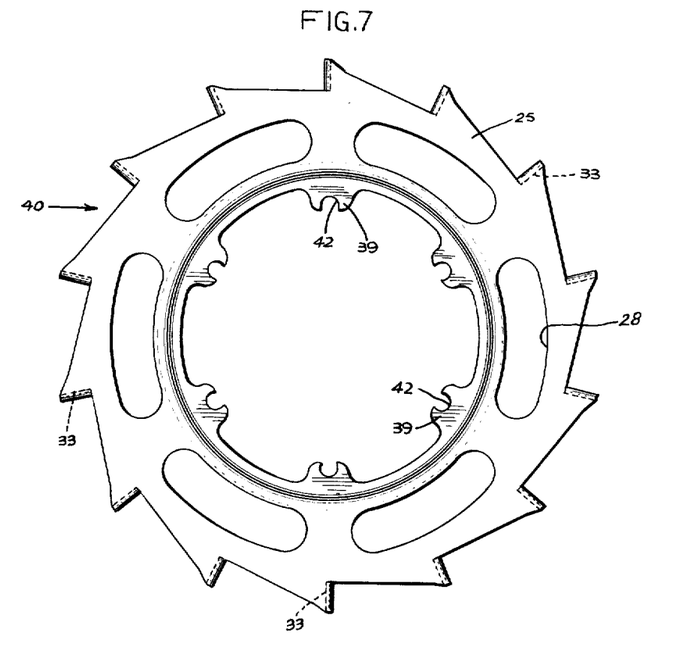
FIG. 7 is a plan view of the fan of FIGS. 5 and 6 depicted in its finished condition.

FIGS. 5-7 illustrate three configurative stages a fan or blowing means 40, generally constituted by annulus 25 and vanes 33, undergoes during manufacture. In the early formative stage of FIG. 5, annulus 25 is shown punched from sheet metal. The annulus defines a radially inner edge or margin forming a circular, central aperture into which secured or securing means, such as six integral lugs 39 radially project. Each lug defines a positioning or locating means, such as a notch, opening, aperture or a semicircular indenture 42, the radius of which approximates that of studs 35. In the subsequent formative stage depicted in FIG. 6, the outer periphery is seen to be serrated by a number of notches 44. The serrations thusly formed are bent back away from the annulus 25 to form vanes 33 which project substantially normally therefrom, as shown in FIG. 7.

Figure 9:
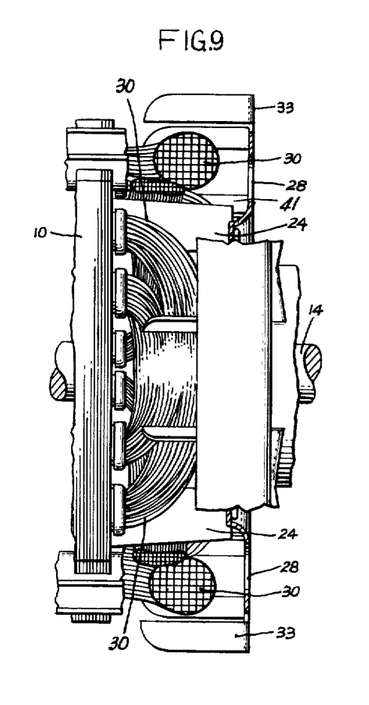
FIG. 9 is a sectional view taken along line 9—9 of FIG. 1.

After formation, fan 40 is rigidly secured to the rotor 20 and disposed adjacent the free end of end turns 30, as shown by reference to FIGS. 8 and 9. This is done by axially placing the annulus 25 in contact with end surfaces on the ends of vanes 24 with alternate studs 35 passing through lug indentures 42. The ends of the alternate studs 35 which so project through notches 42 of the annulus lugs 39 are then pressed or otherwise deformed towards the lugs by suitable means (not shown) well known in the art. This action against the deformable studs 35 causes them to extrude or deform generally radially and/or laterally thereby tightly sandwiching the lugs 39 in mounting engagement between vane ends 45 and the extruded head portion 37a of the studs. As the lugs 39 are integral with annulus 25, the annulus becomes tightly secured to vanes 24. If desired, the serrations may be bent to form vanes 33 simultaneously with the securing of the fan to the rotor.

After fan 40 has been secured to vanes 24, as described above, rotatable assembly 17 is axially inserted into bore 18 and axially and radially positioned within stator core 10. With rotor 29 properly positioned within core 10, vanes 33 circumferentially encompass at least a part of vanes 24, as shown in FIG. 9, and extend generally coaxially with shaft 14. Annular grouping of winding end turns 30 is thusly disposed within a generally annular chamber or air space 41 bounded by or defined between the two sets of rotatable vanes 24, 33 and the annulus 25 with vents 28 disposed closely adjacent the free end of the grouping of end turns. End shield 12 may now be secured to core 10 with rotor shaft 14 journalled through bearings (not shown) carried by the end shield. The aforementioned positioning shims (not shown) may be removed through vents 28 in fan 40 from between bore 18 of magnetic core 10 and rotor 20.

Upon motor energization, vanes 24 and 33 secured to rotor 20, as described above, rotate about the inner and outer periphery of annular grouping of end turns 30 while vents 28 rotate adjacent the ends thereof. Air is thusly drawn into chamber 41 into contact with the end turns 30 by the rotating vanes 24, 33 through the vents 28 and thence expelled radially away therefrom through chamber 41 and vanes 33. Lint or other foreign particles which may have settled from the environment in which the motor is operated upon the outer periphery of the end turn grouping 30 during motor nonuse is blown loose and displaced by the rotating vanes. Larger particles or particuate aggregation which may accumulate on the outer periphery of end turns 30 may actually be brushed or knocked away by impact with the rotating vanes 33. The vanes 33 thus may serve the dual functions of passing or circulating air over the peripheral surface of the end turns to effect cooling while simultaneously sweeping foreign particles which may collect on the same surface therefrom to effect cleaning and thereby prevent any deleterious overheating of the windings due to the insulating properties or effect of particulate build-up or envelopment on the annular grouping of end turns 30, as discussed hereinbefore.

In the event it becomes desirable to replace fan 40, end shield 12 adjacent thereto is removed from beams 15. The fan 40 is then removed from vanes 33 without regards for salvaging, and discarded. A substitute fan is then placed in contact with end surfaces 45 of vanes 33 with the as yet undeformed alternate studs 35 passing through lug indentures 42. The ends of these studs are then deformed in the aforementioned manner thereby securing the substitute fan to the rotatable assembly 17. End shield 12 is then remounted to beams 15.

It should be understood that the just described embodiments merely illustrate principles of the invention. Many modifications may, of course, be made thereto without departure from the spirit and scope of the invention as set forth in the following claims.

What I claim as new and desire to secure by Letters Patent of the United States is:

1. A dynamoelectric machine comprising a magnetic core having a pair of opposite end faces, a bore in the core between the end faces thereof, a plurality of annularly disposed winding receiving slots extending through the bore between the end faces; a plurality of windings passing through the slots and including end turns passing between at least some of the slots adjacent at least one of the end faces to collectively form a generally annular grouping of end turns; and a rotatable assembly including a rotor mounted for rotation in the bore and having a pair of opposite ends, a pair of end rings respectively secured to the opposite ends of the rotor, a shaft coaxially mounted to the rotor, a first set of annularly disposed vanes extending from at least one of the end rings adjacent the inner periphery of the end turns, an annulus having a central aperture therein, a plurality of indentures in the annulus extending generally radially from the central aperture and into which indentures at least some of the vanes of the first vane set are received in mounting engagement with the annulus, and a second set of annularly disposed vanes on the annulus adjacent the outer periphery of the end turns, the vanes of the second vane set of extending generally normally from adjacent the outer periphery of the annulus and being generally parallel to the vanes of the first vane set.

2. A dynamoelectric machine in accordance with claim 1 wherein the annulus includes a set of vents disposed generally adjacent the end turns.

3. A dynamoelectric machine comprising a magnetic core having a pair of opposite end faces, a bore in the core, a plurality of winding receiving slots in the bore between the end faces; a plurality of windings in the slots and including end turns in a generally annular grouping thereof adjacent at least one of the end faces; and a rotatable assembly including a rotor mounted for rotation in the bore, an end ring on the rotor, a first set of annularly disposed vanes extending from the end ring adjacent the inner periphery of the end turns, an annulus mounted to at least some of the vanes of the first vane set including a plurality of vents in the annulus adjacent the end turns, and a second set of annularly disposed vanes on the annulus adjacent the outer periphery of the end turns whereby rotation of the second vane set draws air through the vents into contact with the end turns and thence radially away therefrom the outer periphery of the annulus being serrated form a set of teeth from which the vanes of the second vane set respectively extend.

4. A dynamoelectric machine comprising a magnetic core having a pair of opposite end faces, a bore in the core between the end faces thereof, a plurality of winding receiving slots in the bore between the end faces, a plurality of windings in the slots including a plurality of end turns in a generally annular grouping thereof adjacent at least one of the end faces, and a rotatable assembly including a rotor mounted for rotation in the bore, at least one end ring on the rotor, a first set of annularly disposed vanes extending from the one end ring adjacent the inner periphery of the end turns, a stud on at least some of the vanes of the first vane set and respectively projecting therefrom, and a generally annular blower including a set of apertures into which the studs projecting from the first vane set are secured thereby to mount the blower to the rotatable assembly, a plurality of vents in the blower adjacent the end turns, and a second set of annularly disposed vanes adjacent the outer periphery of the end turns for drawing air through the vents into contact with the end turns and then generally radially away therefrom upon rotation of the blower.

5. A dynamoelectric machine comprising a magnetic core having a bore and a plurality of winding receiving slots communicating longitudinally through said core between two core faces; electrically energizable windings passing through said slots and including end turns passing between slots adjacent at least one of said core faces to collectively form an annular grouping of end turns; and a rotatable assembly including a rotor mounted for rotation within said bore, an end ring mounted to said rotor, a first set of annularly disposed vanes projecting from said end ring adjacent the inner periphery of said annular grouping of end turns, and an annulus having a serrated edge from which a second set of vanes extend about the outer periphery of said annular grouping of end turns, said annulus being mounted to said first set of vanes.

6. A dynamoelectric machine comprising a magnetic core, a rotor rotatably disposed with the core, an end ring secured to the rotor, a first set of vanes projecting from the end ring, a plurality of studs projecting from the ends of the first vane set with a first set of studs included in the plurality of studs having stud neck portions and stud ends portions spreading generally radially therefrom, an annulus extending generally radially from the stud neck portions of the first stud set in abutment with the ends of the first vane set and the stud end portions, and a second set of vanes extending from the annulus in spaced relation about the first vane set.

7. A dynamoelectric machine in accordance with claim 6 wherein said second set of vanes extend from adjacent the outer periphery of said annulus generally coaxially of said first set of vanes.

8. A dynamoelectric machine in accordance with claim 6 wherein the studs of a second set thereof within said plurality of studs have stud neck portions and stud end portions, and wherein said stud end portions of said first set of studs spread laterally more than the stud end portions of said second set of studs.

9. A dynamoelectric machine comprising a stator, a plurality of windings in the stator which collectively form a generally annular grouping of end turns having a free end thereof spaced generally axially of the stator, a rotor mounted for rotation in the stator, a plurality of vanes generally annularly disposed on the rotor and extending therefrom adjacent the inner periphery of the annular grouping of end turns, and means for blowing air over the annular grouping of end turns including a generally annular portion disposed adjacent the free end of the annular grouping of end turns and mounted to at least some of the vanes, and a plurality of other vanes bent from the annular portion adjacent its outer periphery so as to extend generally perpendicularly therefrom over at least a part of the outer periphery of the annular grouping of end turns adjacent thereto and generally coaxially with the first named vanes, the other vanes defining with the annular portion a peripheral generally serrated edge thereon.

10. A dynamoelectric machine as set forth in claim 9 wherein the annular portion is secured adjacent its radially inner periphery to the some of the first named vanes.

11. A dynamoelectric machine as set forth in claim 9 wherein the annular portion includes means through which air may be drawn for passage over the annular grouping of end turns upon the rotation of the rotor.

12. A dynamoelectric machine as set forth in claim 11 wherein the first named vanes, the annular portion and its other vanes define a generally annular chamber about the end turns, and the passage means communicating with the chamber wherein upon rotation of the rotor air may be blown through the chamber over the end turns thereby to displace any foreign particles which may settle onto the end turns when the dynamoelectric machine is de-energized.

13. A dynamoelectric machine as set forth in claim 9 wherein the other vanes are predeterminately spaced from the outer periphery of the end turns a distance great enough to obviate interferring engagement therebetween and yet close enough to engage and brush away an aggregation of foreign particles which may accumulate on the outer periphery of the end turns.

14. A dynamoelectric machine comprising a stator having windings therein which collectively form a generally annular grouping of end turns, a rotor mounted for rotation in the stator and having a plurality of vanes disposed generally adjacent the inner periphery of the end turns, means for blowing air over the end turns extending generally adjacent the free end portion of the end turns, stud means integral with at least some of the vanes and deformed into engagement with the blowing means for mounting it to the rotor, and means on the blowing means for locating it on at least some of the stud means relative to the vanes wherein the stud means is deformed into the engagement with the blowing means generally about the locating means.

15. A dynamoelectric machine comprising a stator having windings therein which collectively form a generally annular grouping of end turns, a rotor mounted for rotation in the stator and having a plurality of vanes disposed generally adjacent the inner periphery of the end turns, means for blowing air over the end turns extending generally adjacent the free end portion of the end turns; means integrally formed on at least some of the vanes for receiving the blowing means in mounting engagement therewith, means integral with the blowing means adapted to be secured in mounting engagement to the receiving means, wherein the receiving means comprise a plurality of studs, and a portion of the studs being deformed into engagement with the secured means thereby to maintain the secured means against displacement from the rotor.

16. A dynamoelectric machine as set forth in claim 15 wherein the blowing means is constituted by a generally annular member disposed adjacent the free end portion of the end turns, the secured means being integral with said member adjacent its radially inner periphery, and a plurality of other vanes bent from the member adjacent its radially outer periphery and extending over at least a part of the outer periphery of the annular grouping of end turns.

17. A dynamoelectric machine as set forth in claim 16 wherein the number comprises at least one opening through which air is drawn for passage over the end turns.

18. A dynamoelectric machine as set forth in claim 17 wherein the first named vanes and the member and its other vanes define a generally annular chamber about the end turns, the opening communicating with the chamber whereby upon rotation of the rotor air may be blown through the chamber over the end turns to displace any foreign particles which may have settled thereon.

19. A dynamoelectric machine as set forth in claim 16 wherein the other vanes are predeterminately spaced from the outer periphery of the annular grouping of end turns a distance great enough to obviate interferring engagement therebetween and yet close enough to engage and brush away an aggregation of foreign particles which may accumulate on the outer periphery of the annular grouping of end turns.

20. A dynamoelectric machine comprising a stator having windings therein which collectively form a generally annular grouping of end turns, a rotor mounted for rotation in the stator and having a plurality of vanes disposed adjacent the inner periphery of the end turns, means for blowing air over the end turns extending generally adjacent the free end portion of the end turns; means integrally formed on at least some of the vanes for receiving the blowing means in mounting engagement therewith, and means integral with the blowing means adapted to be secured in mounting engagement to the receiving means including a plurality of notches received on the receiving means wherein the receiving means may be deformed into engagement with the blowing means generally about the notches therein.

21. A dynamoelectric machine as set forth in claim 20 wherein the secured means further includes a plurality of lugs extending from the blowing means, the notches being disposed in the lugs.

22. A dynamoelectric machine as set forth in claim 21 wherein the receiving means comprises a plurality of studs, the notches being received on the studs, and a portion of the studs being deformed into the engagement with the lugs thereby to maintain the blowing means against displacement from mounting engagement with the vanes.

23. A dynamoelectric machine comprising a stator having windings therein which collectively form a generally annular grouping of end turns, a rotor mounted for rotation in the stator and having a plurality of vanes disposed generally adjacent the inner periphery of the end turns, means for blowing air over the end turns extending generally adjacent the free end portion of the end turns, means integrally formed on at least some of the vanes and adapted to be deformed into displacement preventing engagement with the blowing means for mounting it to the rotor, the mounting means being generally constituted by a plurality of studs extending generally from an end portion of the vanes and integrally formed therewith, and means on the blowing means for locating it on at least some of the mounting means relative to the vanes wherein the mounting means is deformed into the displacement preventing engagement with the blowing means generally about the locating means thereby to mount the blowing means to the rotor.

24. A dynamoelectric machine as set forth in claim 23, wherein the studs respectively include a portion adjacent the vane end portion on which the locating means may be disposed when the stud is deformed into the displacement preventing engagement with the blowing means.

25. A dynamoelectric machine as set forth in claim 23, wherein the studs respectively include a portion deformed into the displacement preventing engagement with the blowing means and maintaining it in abutment with the vane end portion.

26. A dynamoelectric machine comprising a stator having windings therein which collectively form a generally annular grouping of end turns, a rotor mounted for rotation in the stator and having a plurality of vanes disposed generally adjacent the inner periphery of the end turns, means for blowing air over the end turns extending generally adjacent the free end portion of the end turns, means integrally formed on at least some of the vanes and adapted to be deformed into displacement preventing engagement with the blowing means for mounting it to the rotor, and means on the blowing means for locating it on at least some of the mounting means relative to the vanes wherein the mounting means is deformed into the displacement preventing engagement with the blowing means generally about the locating means thereby to mount the blowing means to the rotor, the locating means being generally constituted by a plurality of openings in the blowing means extending therethrough and in which at least a portion of the mounting means is disposed.

27. A dynamoelectric machine comprising a stator having windings therein which collectively form a generally annular grouping of end turns, a rotor mounted for rotation in the stator and having a plurality of vanes disposed generally adjacent the inner periphery of the end turns, means for blowing air over the end turns extending generally adjacent the free end portion of the end turns, means integrally formed on at least some of the vanes and adapted to be deformed into displacement preventing engagement with the blowing means for mounting it to the rotor, at least some of the vanes with which the mounting means is integrally formed including and end surface, and means on the blowing means for locating it on at least some of the mounting means relative to the vanes wherein the mounting means is deformed into the displacement preventing engagement with the blowing means generally about the locating means thereby to mount the blowing means to the rotor, the displacement preventing engagement of the mounting means with the blowing means urging it into abutment with the vane end surfaces.

28. A dynamoelectric machine comprising a stator having windings therein which collectively form a generally annular grouping of end turns, a rotor mounted for rotation in the stator and having a plurality of vanes disposed generally adjacent the inner periphery of the end turns, means for blowing air over the end turns extending generally adjacent the free end portion of the end turns, means integrally formed on at least some of the vanes and adapted to be deformed into displacement preventing engagement with the blowing means for mounting it to the rotor, means on the blowing means for locating it on at least some of the mounting means relative to the vanes wherein the mounting means is deformed into the displacement preventing engagement with the blowing means generally about the locating means thereby to mount the blowing means to the rotor, and the blowing means including a plurality of other vanes extending over at least a part of the outer periphery of the end turns.

29. A dynamoelectric machine as set forth in claim 28, wherein the first named vanes, the blowing means and its other vanes form a generally annular chamber about the end turns, and means in the blowing means communicating with the chamber for passing air therethrough over the end turns to displace any foreign particles which may have settled thereon upon the rotation of the rotor.

30. A dynamoelectric machine as set forth in claim 28, wherein the other vanes are spaced closely adjacent the outer periphery of the end turns to engage and brush away at least some foreign particles which may aggregate thereon.

* * * * *